United States Patent
Faenger et al.

(10) Patent No.: US 8,649,974 B2
(45) Date of Patent: Feb. 11, 2014

(54) CAMERA-BASED NAVIGATION SYSTEM AND METHOD FOR ITS OPERATION

(75) Inventors: Jens Faenger, Palo Alto, CA (US); Andreas Kynast, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 497 days.

(21) Appl. No.: 12/666,889

(22) PCT Filed: May 9, 2008

(86) PCT No.: PCT/EP2008/055769
§ 371 (c)(1),
(2), (4) Date: May 19, 2010

(87) PCT Pub. No.: WO2009/003749
PCT Pub. Date: Jan. 8, 2009

(65) Prior Publication Data
US 2010/0235080 A1    Sep. 16, 2010

(30) Foreign Application Priority Data
Jun. 29, 2007  (DE) .......................... 10 2007 030 226

(51) Int. Cl.
*G01C 21/36* (2006.01)
(52) U.S. Cl.
CPC ........ *G01C 21/3647* (2013.01); *G01C 21/3635* (2013.01)
USPC .......................................... 701/436; 382/284
(58) Field of Classification Search
USPC .......... 701/400, 523, 538; 382/106, 107, 108, 382/285, 286, 291, 293, 305
See application file for complete search history.

(56) References Cited

U.S. PATENT DOCUMENTS

| | | | | |
|---|---|---|---|---|
| 5,115,398 | A  * | 5/1992 | De Jong | 701/523 |
| 6,182,010 | B1 * | 1/2001 | Berstis | 701/441 |
| 6,278,479 | B1   | 8/2001 | Wilson et al. | |
| 6,285,317 | B1 * | 9/2001 | Ong | 342/357.57 |
| 6,456,288 | B1 * | 9/2002 | Brockway et al. | 345/428 |

(Continued)

FOREIGN PATENT DOCUMENTS

| | | |
|---|---|---|
| EP | 1283406 | 2/2003 |
| JP | 2007-139611 | 6/2007 |

(Continued)

OTHER PUBLICATIONS

Tsai et al., "Polygon-Based Texture Mapping for Cyber City 3D Building Models", International Journal of Geographical Information Science, vol. 21(9), Oct. 2007, pp. 965-981.*

(Continued)

*Primary Examiner* — James Trammell
*Assistant Examiner* — Todd Melton
(74) *Attorney, Agent, or Firm* — Kenyon & Kenyon LLP

(57) ABSTRACT

A navigation system for motor vehicles includes at least one display device for a pictorial representation of the vehicle surroundings, at least one data memory containing data that allow for a three-dimensional reconstruction of the vehicle surroundings, at least one camera capable of recording digital images of the vehicle surroundings, and at least one data processing unit, which is capable of generating a reconstruction of the vehicle surroundings representable on the display device from the data contained in the data memory, and which is capable of performing an at least partial integration of the digital images recorded by the camera into the reconstruction of the vehicle surroundings, which reconstruction is based on the data contained in the data memory.

12 Claims, 2 Drawing Sheets

(56) References Cited

U.S. PATENT DOCUMENTS

| | | | |
|---|---|---|---|
| 6,693,518 B2* | 2/2004 | Kumata et al. | 340/435 |
| 6,744,431 B2* | 6/2004 | Sakamoto et al. | 345/419 |
| 6,744,442 B1* | 6/2004 | Chan et al. | 345/587 |
| 6,885,939 B2* | 4/2005 | Schmidt et al. | 701/428 |
| 7,002,578 B1* | 2/2006 | Ritter | 345/427 |
| 7,343,268 B2* | 3/2008 | Kishikawa | 703/1 |
| 7,583,275 B2* | 9/2009 | Neumann et al. | 345/633 |
| 7,603,208 B2* | 10/2009 | Garceau et al. | 701/3 |
| 7,619,626 B2* | 11/2009 | Bernier | 345/427 |
| 7,983,447 B2* | 7/2011 | Higuchi et al. | 382/103 |
| 8,078,400 B2* | 12/2011 | Meyer | 701/431 |
| 8,175,331 B2* | 5/2012 | Nagaoka et al. | 382/103 |
| 2006/0287819 A1* | 12/2006 | Brulle-Drews et al. | 701/211 |
| 2008/0033645 A1* | 2/2008 | Levinson et al. | 701/213 |

FOREIGN PATENT DOCUMENTS

| | | |
|---|---|---|
| JP | 2007-150681 | 6/2007 |
| JP | 2007-156777 | 6/2007 |
| WO | WO 2006/037402 | 4/2006 |

OTHER PUBLICATIONS

David, "Detection of Building Facades in Urban Environments", Proc. SPIE 6978, Visual Information Processing XVII, Apr. 2008, pp. 1-11.*

International Search Report, PCT/EP2008/055769, dated Oct. 15, 2008.

* cited by examiner

CAMERA-BASED NAVIGATION SYSTEM AND METHOD FOR ITS OPERATION

FIELD OF THE INVENTION

The present invention relates to a camera-based navigation system, as may be used preferably in motor vehicles, and to a method for its operation.

BACKGROUND INFORMATION

Navigation systems used in motor vehicles normally include display devices in the form of monitors or displays, on which three-dimensional representations of the surroundings of the vehicle may be shown. These three-dimensional representations are generated in that, on the basis of position information, corresponding data are selected from a database containing topographic and other surroundings data. On the basis of the selected data, the visible vehicle surroundings are then reconstructed, which are preferably represented on the display device three-dimensionally and in freely selectable perspective. The representation occurs in a highly generalized form, however. That is to say, the courses of roads, three-dimensional structures such a buildings, and prominent landmarks are represented in such a way that the prominent contours are preserved, and visible surfaces are filled with textures resembling their actual appearance. The associated artificial impression of the three-dimensional representation, however, at times makes it difficult to recognize the represented scene quickly in the real surroundings and thus impedes the driver's orientation. The provision of a database that would allow for a comprehensive photo-realistic reconstruction of the vehicle surroundings is normally avoided in navigation systems for reasons of capacity. Another disadvantage of conventional solutions is that the data record required for the reconstruction must be constantly updated, which likewise involves great expenditure. If update cycles are set too long, then smaller visual or structural changes, for example on buildings, may already change the appearance for the driver from his viewing angle in such a way that a sure recognition or a sure orientation becomes substantially more difficult in an often cursory comparison with the scene depicted on the display devices of the navigation system.

A similar problem occurs when visible surfaces are filled with textures that were not generated in imitation of their actual appearance. This may be the case, for example, if no texture information, for buildings for example, is stored in the databases at all.

SUMMARY

Example embodiments of the present invention improve the degree of conformity between the real surroundings of a vehicle and a reconstruction of a scene from these surroundings represented on the display device of a navigation system.

Example embodiments of the present invention include a combination of already stored data suitable for reconstructing the surroundings of a motor vehicle and image data of these surroundings recorded in real time. Example embodiments of the present invention may also be implemented automatically by a navigation system for motor vehicles. This navigation system includes at least one display device for a pictorial representation of the vehicle surroundings, at least one data memory containing data that allow for a three-dimensional reconstruction of the vehicle surroundings, at least one camera capable of recording digital images of the vehicle surroundings, and at least one data processing unit, which is capable of generating a reconstruction of the vehicle surroundings, representable on the display device, from the data contained in the data memory, and which is capable of performing an at least partial integration of the digital images recorded by the camera into the reconstruction of the vehicle surroundings, which reconstruction is based on the data contained in the data memory. Accordingly, example embodiments of the present invention are implemented in a method for improving the conformity between reconstructions of scenes from the surroundings of a vehicle generated virtually by a navigation system and the visual impression of a driver of this vehicle when viewing the real scenes, in which digital images of the vehicle surroundings are recorded with the aid of a camera and are at least partially integrated into a virtual reconstruction of the vehicle surroundings, which virtual reconstruction is based on data in a data memory of the navigation system.

For this purpose, data, which a three-dimensional representation on the basis of standard textures, as is common in navigation systems, form a possible starting point of a reconstruction according to example embodiments of the present invention. According to example embodiments of the present invention, real images recorded in real time by at least one digital camera are integrated into this representation.

This integration of the images recorded in real time may include replacing surfaces covered by standard textures with photorealistic representations using and accordingly integrating the digital images. In another variant, the degree of realism of the hitherto used textures is checked with reference to the digital images. If the degree of realism is found to be too low, that is, if the texture hitherto used is unsuitable, it is replaced with a more suitable texture. For this purpose, multiple textures, which are stored in a corresponding data memory of the navigation system or are otherwise available, may be checked successively with reference to the digital image for their degree of realism and, if applicable, selected for replacing the existing texture. When evaluating the digital image and when a suitable replacement texture is not available, it is also possible to generate a texture and to integrate it into the representation to be displayed. Already when working with optimized textures, it is possible to achieve a substantially improved visual impression of the representation of surroundings in navigation systems. The advantage of working with textures lies in the fact that improving a texture or replacing a standard texture with a texture that is optimized by adjustment to a digital image entails only a marginal increase in the quantity of data to be stored in the event of a permanent use of the mixed images generated in accordance with example embodiments of the present invention. Yet the use of optimized textures represents a substantial improvement and a simple possibility of updating the data record of a navigation system. It is true that the integration of current camera images or camera image sections of the vehicle surroundings into the virtual three-dimensional representation makes a separate generation or selection of a texture superfluous in these areas, but it also places substantially higher requirements on storing the images with respect to storage space.

Advantageously, basic patterns of standard textures may be preserved and be subdivided automatically with the aid of the evaluated camera images into multiple new and more detailed grades of textures.

Example embodiments of the present invention provide various additional advantages. First, an improved conformity and improved recognition of the screen representation is achieved with respect to the vehicle surroundings perceived by the driver. The more realistic representation facilitates the orientation of a driver of the vehicle. The convenience of use is increased because the representation is more varied and visually appealing since one is no longer restricted to working with only a few standard textures. Furthermore, the method may be implemented cost-effectively if hardware may be used that already exists in any event in the vehicle in the form of cameras. This is the case for example if a vehicle has a backup or parking assistance system or a system for facilitating night driving, which is based on the use of night vision devices and corresponding camera technology.

Example embodiments of the present invention are explained in greater detail below with reference to the appended figures.

DETAILED DESCRIPTION

Figure 1:
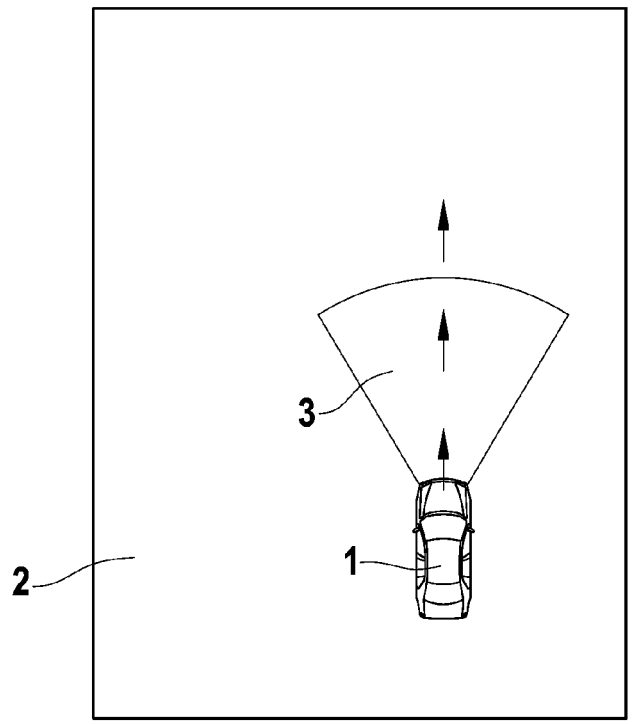
FIG. 1 is a schematic representation of a vehicle equipped in accordance with an example embodiment of the present invention in a representable surrounding region.

FIG. 1 shows a vehicle 1 equipped with a navigation system of an example embodiment of the present invention in a surrounding region 2, which may be reconstructed on the basis of data stored in a data memory of the navigation system and represented on a display device in the form of a monitor. Vehicle 1 moves in the direction of the arrows. A part of this region is seen by a camera associated with the navigation system and oriented in the direction of travel, which yields another region 3 from the resolution and the image angle of the camera, which may be recorded as a digital image having a resolution evaluable by the system and stored as a digital image data record. The digital image data and information thus obtained may be included at least partially by an appropriate integration in the original reconstruction of the vehicle surroundings and may thus become part of the view of the vehicle surroundings displayed on the monitor directly by superposition on the existing representation or indirectly by a change or optimization of graphical parameters. For this purpose it is necessary to perform a geometrical adjustment between the data-based reconstruction of the vehicle surroundings and the digital recording of the camera, which may be supported by software for pattern recognition and equalization. This is in turn necessary in order to be able definitely to assign mutually corresponding surfaces and prevent misinterpretations. The representation of the vehicle surroundings generated in this manner in accordance with example embodiments of the present invention on the monitor of the navigation system is based on a processing of originally provided surroundings data with the inclusion of digital images recorded in real time. By processing the originally provided data, these may thus at the same time be updated. Hence it is advantageous for a further use of the updated data if the processed data are stored in a data memory. It is particularly advantageous if the data for the reconstruction of the vehicle surroundings are retrieved from a central data memory and if the processed data are stored in a central data memory, which preferably may be connected to several terminal units of navigation systems, the processed data being stored in such a way that the data stored in the central data memory following another retrieval form the basis of a reconstruction of the vehicle surroundings. In this manner it is possible to build up a data base that is automatically updated with each use. In this connection, terminal devices of navigation systems are to be understood as the vehicle-side components of navigation systems according to example embodiments of the present invention.

Figure 2:
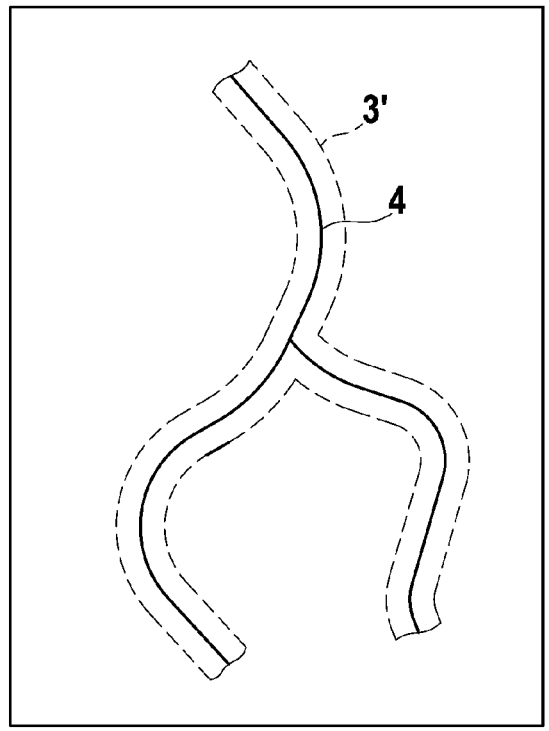
FIG. 2 is a schematic representation of a surrounding region updated according to an example embodiment of the present invention.

FIG. 2 shows in which region 3' it is possible to record digital images when a vehicle is driving a route 4, if the method of example embodiments of the present invention is permanently in use. This yields tube-shaped recorded regions 3', in which, if a data update according to example embodiments of the present invention was carried out, extraordinarily up-to-date surroundings data are available if the route is frequented often. If the updated data are made available in a central memory, for example on a server, then there gradually arises a surface-filling superposition of the permanently updated image data when multiple vehicles equipped in accordance with example embodiments the present invention are involved in the data updating process. The updated data form the basis of future reconstructions of surroundings for representation on the display device of the navigation systems, which in turn are updated when route 4 is driven again. This yields a cost-effective system of updating data since special trips for updating purposes may be eliminated. In addition, these data may also be made available to users who themselves do not have a camera-based navigation system according to example embodiments of the present invention, but who are able to receive the data generated in accordance with example embodiments of the present invention and who would like to include these in the conventional manner in their navigation system in order to benefit from their being highly up-to-date.

Figure 3:
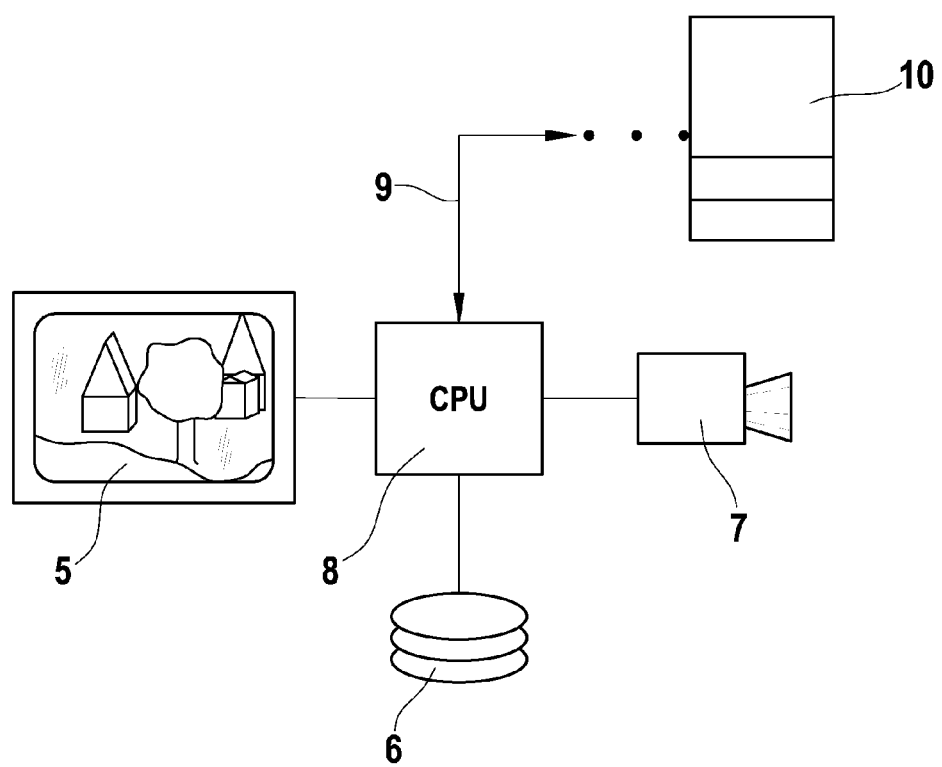
FIG. 3 is a schematic representation of a navigation system according to an example embodiment of the present invention.

FIG. 3 shows a schematic representation of a navigation system according to an example embodiment the present invention. It includes an electronic display device in the form of a monitor 5, as may also be used in conventional navigation systems. Furthermore, a data memory 6 is included, which contains data that allow for a three-dimensional reconstruction of the surroundings of the vehicle equipped with the navigation system. Data memory 6 advantageously includes an exchange medium in order to be able to include or exchange user-specific data records retroactively. According to example embodiments of the present invention, the navigation system also includes at least one digital camera 7, which is able to record digital images of the vehicle surroundings. For the functioning of the navigation system according to example embodiments of the present invention it does not matter whether digital camera 7 is used exclusively in the navigation system or whether it is simultaneously or alternatingly a component of additional camera-based systems of the vehicle. A digital monoscopic camera suffices as a camera, digital stereoscopic cameras being suitable as well. Furthermore, a data processing unit 8 is included, which has at least the capacity to be able to generate from the data contained in data memory 6 a reconstruction of the vehicle surroundings representable on monitor 5 and to be able to perform an at least partial integration of the digital images recorded by digital camera 7 into the reconstruction of the vehicle surroundings based on the data contained in data memory 6. This data processing unit 8 furthermore has a connection device 9 to a central data memory 10 on a server, from which data processing unit 8 is able to retrieve data for a reconstruction of the vehicle surroundings and in which data processed by data processing unit 8 may be stored. Connection device 9 includes a wireless connection to a radio communications network, via which the contact to the server is established as needed. The server having central data memory 10 is able to be simultaneously queried or addressed as a data memory by multiple terminal units, that is, navigation systems equipped in accordance with example embodiments of the present invention.

When driving with the navigation system according to example embodiments of the present invention, in the present example, the real surroundings of the vehicle are permanently optically recorded by comprised digital camera 7, digital images being generated in quick temporal succession. Subsequently, the images are decomposed on the basis of known building positions, building dimensions and building locations as well as other prominent structures such as traffic areas for example. With the aid of pattern recognition it is possible to allocate identified surfaces to the corresponding surfaces in the data memory-based reconstruction of the vehicle surroundings. In a next step, images supplied by camera 7 may be included in real time into the computation of the three-dimensional representation of the surroundings and displayed on monitor 5. Plausibility checks may help to exclude temporary obstacles, for example parked vehicles, from the image evaluation of example embodiments of the present invention. The recognizability is already clearly increased if individual image sections are laid onto prominent objects such as buildings for example, that is, if images mixed from virtual three-dimensional images in combination with regionally photo-realistically displayed sections.

Since, in order to achieve a natural visual impression, photorealistic representations must always also follow the outside lighting conditions, the respective weather, time of day, and similar factors, their storage in a central system is possibly less important than a texture-based or at least largely texture-based central data storage. Since, in the course of reconstructing vehicle surroundings from normally stored data in conventional navigation systems, buildings and surfaces are assigned only standard textures, in this case too, the viewer convenience is substantially increased by using the system of example embodiments of the present invention because the degree of conformity of a displayed textured surface with its actual visual appearance is substantially improved.

As an alternative or in addition to including the images of digital camera 7 into the computation of the three-dimensional representation of the vehicle surroundings, for this purpose the reconstructed surfaces displayable as textured are compared to the corresponding surfaces of the digital images. If the difference with respect to a stored texture is found to be too great, then this texture is replaced by another texture stored in a memory or a new texture is created. Both data memory 6 contained in the vehicle as well as central data memory 10 of the server may be used for storing prepared textures. The newly created or exchanged texture has in any event a greater resemblance to the corresponding surface in the real surroundings.

In another advantageous example embodiment, new textures are checked in the course of a texture management for similarity to already stored textures. If indicated, similar textures may be combined, which may be useful particularly following plausibility checks in order to keep the database manageable. The textures may be recognized and distinguished with respect to color and/or their structure. For the number of texture gradations there may be restrictions with respect to colors and structures, it being possible in the system of example embodiments of the present invention to achieve an improvement in the display quality even in the case of a lower number of textures if primarily textures are introduced that have to be replaced only rarely in a data update of example embodiments of the present invention, which speaks for an already natural reconstruction of the vehicle surroundings.

What is claimed is:

1. A navigation system for a motor vehicle, comprising:
   at least one display device configured to pictorially represent vehicle surroundings;
   at least one data memory adapted to store data that represent a three-dimensional reconstruction of the vehicle surroundings;
   at least one camera configured to record digital images of the vehicle surroundings; and
   at least one data processing unit configured to:
   generate, from the data stored in the data memory, a reconstruction of the vehicle surroundings representable on the display device; and
   perform an at least partial integration of the digital images recorded by the camera into the reconstruction of the vehicle surroundings to produce a modified version of the reconstruction;
   wherein, if the at least partial integration of the digital images is determined to be unsuitable, a new texture is generated and integrated into a corresponding portion of the reconstruction without modification of other portions of the reconstruction.

2. The navigation system according to claim 1, wherein at least one camera is arranged as a component of another camera-based system belonging to the vehicle.

3. The navigation system according to claim 1, wherein the camera is arranged as a component of at least one of (a) a backup assistance system, (b) a parking assistance system, and (c) a system for night driving assistance.

4. The navigation system according to claim 1, further comprising a connection device to a central data memory, from which the data processing unit is able to retrieve data for a reconstruction of the vehicle surroundings and/or in which data processed by the data processing unit may be stored, the central data memory connectable to multiple terminal units of navigation systems.

5. The navigation system according to claim 1, wherein the at least partial integration includes replacing surface structures of the reconstruction of the vehicle surroundings with at least some of the digital images.

6. A method for improving the conformity between reconstructions of scenes from the surroundings of a vehicle generated virtually by a navigation system and displayed on a display device and a visual impression of a driver of the vehicle when viewing the real scenes, the method comprising:
   recording digital images of the vehicle surroundings with the aid of a camera; and
   at least partially integrating the digital images into a reconstruction of vehicle surroundings, which reconstruction is based on data that represent the reconstruction and that are stored in a data memory of the navigation system, wherein the at least partially integrating produces a modified version of the reconstruction;
   wherein, if the at least partial integration of the digital images is determined to be unsuitable, a new texture is generated and integrated into a corresponding portion of the reconstruction without modification of other portions of the reconstruction.

7. The method according to claim 6, wherein at least some surface areas of the reconstructions of scenes from the surroundings of the vehicle displayed on the display device are superposed by adapted sections from digital images of the corresponding scenes.

8. The method according to claim 6, wherein in at least some surfaces of the reconstructions of scenes from the surroundings of the vehicle represented on the display device a comparison is performed between a texture represented in the reconstruction and the associated image section of the digital image and the texture is replaced by the generated new texture if too great of a deviation is ascertained.

9. The method according to claim 8, wherein a data processing unit checks whether a more suitable texture is stored in a data memory for replacing the texture and performs the replacement of the texture or by evaluating the surface having the texture to be replaced of the corresponding section of a digital image generates the generated new texture that better corresponds to the real view of the relevant surface than the texture to be replaced and replaces the latter with the generated new texture.

10. The method according to claim 6, wherein the modified version of the reconstruction is stored in the data memory.

11. The method according to claim 6, wherein the data for the reconstruction of the vehicle surroundings are retrieved from a central data memory and the processed data are stored in a central data memory, which is connectable to several terminal units of navigation systems, the processed data being stored in such a way that the data stored in the central data memory, following another retrieval are able to form the basis of a reconstruction of the vehicle surroundings.

12. The method according to claim 6, wherein the at least partially integrating includes replacing surface textures of the reconstruction of the vehicle surroundings with the digital images.

* * * * *

UNITED STATES PATENT AND TRADEMARK OFFICE
CERTIFICATE OF CORRECTION

PATENT NO. : 8,649,974 B2  Page 1 of 1
APPLICATION NO. : 12/666889
DATED : February 11, 2014
INVENTOR(S) : Faenger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 811 days.

Signed and Sealed this

Twenty-ninth Day of September, 2015

Michelle K. Lee
*Director of the United States Patent and Trademark Office*